(12) United States Patent
Mitani et al.

(10) Patent No.: US 9,046,172 B2
(45) Date of Patent: Jun. 2, 2015

(54) AUTOMATIC TRANSMISSION CONTROL APPARATUS

(75) Inventors: Akihiro Mitani, Aki-gun (JP); Keiichiro Sueshige, Hiroshima (JP); Yasuo Shigenaka, Otake (JP); Daisuke Shishido, Hiroshima (JP); Yusuke Moriyama, Hiroshima (JP); Kenji Sawa, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 154 days.

(21) Appl. No.: 13/994,590

(22) PCT Filed: Dec. 19, 2011

(86) PCT No.: PCT/JP2011/007082
§ 371 (c)(1),
(2), (4) Date: Jun. 14, 2013

(87) PCT Pub. No.: WO2012/090428
PCT Pub. Date: Jul. 5, 2012

(65) Prior Publication Data
US 2013/0275016 A1    Oct. 17, 2013

(30) Foreign Application Priority Data
Dec. 27, 2010 (JP) ................. 2010-290887

(51) Int. Cl.
*F16H 61/12* (2010.01)
*F16H 59/72* (2006.01)

(52) U.S. Cl.
CPC ............. *F16H 61/12* (2013.01); *F16H 59/72* (2013.01); *F16H 2061/1212* (2013.01); *F16H 2061/1216* (2013.01); *F16H 2061/1284* (2013.01)

(58) Field of Classification Search
None
See application file for complete search history.

(56) References Cited

U.S. PATENT DOCUMENTS 5,830,106 A * 11/1998 Abe ................................ 477/98
5,995,887 A * 11/1999 Hathaway et al. ........... 701/30.1
6,663,279 B1 * 12/2003 Heinzelmann et al. ....... 374/144

(Continued)

FOREIGN PATENT DOCUMENTS

CN    1345415 A    4/2002
CN    1926361 A    3/2007

(Continued)

OTHER PUBLICATIONS

International Search Report; PCT/JP2011/007082; Jan. 24, 2012.
(Continued)

Primary Examiner — Edward Torchinsky
(74) Attorney, Agent, or Firm — Studebaker & Brackett PC

(57) ABSTRACT

The present invention provides an automatic transmission control apparatus which comprises a first temperature detection device for detecting a temperature of hydraulic oil stored in an automatic transmission; an automatic transmission control device installed in a same casing as that in which the hydraulic oil is stored; a second temperature detection device for detecting a temperature of the automatic transmission control device; and a malfunction determination section for comparing the temperature of the automatic transmission control device detected by the second temperature detection device with the temperature of the hydraulic oil detected by the first temperature detection device to determine whether or not a malfunction occurs in the first temperature detection device.

10 Claims, 6 Drawing Sheets

(56) References Cited

U.S. PATENT DOCUMENTS

| | | | |
|---|---|---|---|
| 8,042,998 B2 * | 10/2011 | Choi et al. | 374/144 |
| 2006/0149441 A1 * | 7/2006 | Takamura | 701/34 |
| 2008/0033618 A1 | 2/2008 | Kwon | |
| 2008/0253429 A1 * | 10/2008 | Choi et al. | 374/144 |
| 2010/0195693 A1 | 8/2010 | Kitajima | |
| 2013/0275016 A1 * | 10/2013 | Mitani et al. | 701/62 |

FOREIGN PATENT DOCUMENTS

| | | |
|---|---|---|
| CN | 101118013 A | 2/2008 |
| JP | 05-209681 A | 8/1993 |
| JP | 07-259984 A | 10/1995 |
| JP | 07-301315 A | 11/1995 |
| JP | 2000-136872 A | 5/2000 |
| JP | 2000-170568 A | 6/2000 |
| JP | 2010-151282 A | 7/2010 |
| JP | 2010-180927 A | 8/2010 |

OTHER PUBLICATIONS

The first Office Action issued by the Chinese Patent Office on Sep. 3, 2014, which corresponds to Chinese Patent Application No. 201180061116.0 and is related to U.S. Appl. No. 13/994,590; with English language summary.

* cited by examiner

AUTOMATIC TRANSMISSION CONTROL APPARATUS

TECHNICAL FIELD

The present invention relates to an automatic transmission control apparatus comprising a temperature detection device for detecting a temperature of hydraulic oil stored in an automatic transmission.

BACKGROUND ART

Heretofore, as disclosed in the following Patent Document 1, there has been known an automatic transmission speed change control apparatus equipped with an oil temperature sensor for detecting a temperature of oil for engaging a frictional engagement unit of an automatic transmission, and adapted to prohibit a specific speed change when a temperature of the oil detected by the oil sensor is equal to or less than a predetermined reference temperature, wherein the speed change control apparatus comprises: failure detection means operable to detect an abnormality of the oil temperature sensor; oil temperature estimation means operable, when an abnormality of the oil temperature sensor is detected, to estimate a temperature of the oil; and prohibition control means operable, when the estimated temperature of the oil is equal to or less than the reference temperature, to prohibit the specific speed change, and, when the estimated temperature of the oil is greater than the reference temperature, to release the prohibition of the specific speed change, whereby it becomes possible to prevent worsening of speed change shock and deterioration in durability of the frictional engagement unit, in the event of failure of the oil temperature sensor.

Further, as disclosed in the following Patent Document 2, there has been known an automatic transmission control unit thermal runaway preventive apparatus for preventing runaway of an automatic transmission control unit under a high temperature equal to or greater than a given value, wherein the thermal runaway preventive apparatus comprises temperature monitoring means operable, when a temperature detected in or around the automatic transmission control unit is equal to or greater than a predetermined first temperature, to temporarily stop a function of the automatic transmission control unit until the detected temperature is lowered to be less than the first temperature or greater than the first temperature by a value corresponding to hysteresis, and, when the detected temperature is equal to or greater than a predetermined second temperature greater than the first temperature, to completely stop the function of the automatic transmission control unit even after the detected temperature is lowered to be less than the second temperature, whereby it becomes possible to prevent runaway of the automatic transmission control unit when it is disposed in an environment where a temperature change is more likely to occur.

LIST OF PRIOR ART DOCUMENTS

Patent Documents

Patent Document 1: JP 07-259984A
Patent Document 2: JP 2000-136872A

SUMMARY OF THE INVENTION

Problem to be Solved by the Invention

On an assumption that, in a situation where a given time period of about 5 minutes has elapsed after moving ignition key to an ON position to start an engine operation, the temperature of the hydraulic oil in the automatic transmission is raised, the automatic transmission speed change control apparatus disclosed in the Patent Document 1 is operable, in the above situation and when an output of the oil temperature sensor does not reach a temperature to be originally assumed, or when an output from the oil temperature sensor has no change continuously for a given time period or more, to determine that a malfunction occurs in the oil temperature sensor. However, even if the automatic transmission control apparatus disclosed in the Patent Document is employed, it is difficult to accurately determine a malfunction in the oil temperature sensor, because the temperature of the hydraulic oil stored in the automatic transmission fluctuates depending on an external environment, an engine operation history and others, so that, even in the situation where a given time period has elapsed after start of the engine operation (engine startup), the temperature of the hydraulic oil is not always raised to a given temperature.

The automatic transmission control unit disclosed in the Patent Document 2 is provided with the temperature monitoring means operable to stop the function of the automatic transmission control unit temporarily or completely depending on the temperature detected in or around the automatic transmission control unit by a temperature sensor. Thus, as long as the temperature sensor normally operates, it is possible to prevent runaway of the automatic transmission control unit which would otherwise be caused by a situation where it is heated to high temperatures, even when the automatic transmission control unit is disposed in an inside of the automatic transmission where a temperature is more likely to rise, as compared to an inside of a passenger compartment. However, if a surrounding temperature of the automatic transmission control unit cannot be accurately detected due to the occurrence of a malfunction in the temperature sensor, a problem arises that the function of the automatic transmission control unit is stopped, regardless of a situation where the surrounding temperature of the automatic transmission control unit is equal to or less than a given value, or runaway of the automatic transmission control unit cannot be prevented, regardless of a situation where the surrounding temperature of the automatic transmission control unit is equal to or greater than the given value.

The present invention has been made in view of the above problems, and an object thereof is to provide an automatic transmission control apparatus capable of adequately detecting, with a simple configuration, a malfunction in a temperature detection device for detecting a temperature of hydraulic oil stored in an automatic transmission, and effectively prevent a defect in automatic transmission control from occurring due to the occurrence of a malfunction in the temperature detection device.

Solution to the Technical Problem

The present invention provides an automatic transmission control apparatus which comprises: a first temperature detection device for detecting a temperature of hydraulic oil stored in an automatic transmission; an automatic transmission control device installed in the same casing as that in which the hydraulic oil is stored; a second temperature detection device for detecting a temperature of the automatic transmission control device; and a malfunction determination section for comparing the temperature of the automatic transmission control device detected by the second temperature detection device with the temperature of the hydraulic oil detected by the first temperature detection device to determine whether or not a malfunction occurs in the first temperature detection device.

A conventional technique includes a type configured to detect the presence or absence of a malfunction in a temperature sensor based on an assumed temperature of hydraulic oil assumed depending on an elapsed time period after start of an engine operation. In this type of conventional technique, an erroneous determination is likely to occur due to, for example, a situation where an actual temperature of the hydraulic oil fluctuates depending on an external environment, an engine operation history and others, and becomes different from the assumed temperature. In contract, the automatic transmission control apparatus of the present invention can solve the above conventional problems to obtain an advantage of being able to accurately determine a malfunction in the first temperature detection device, and effectively prevent, with a simple configuration, a defect in automatic transmission control from occurring due to a situation where the automatic transmission control is performed based on a detected temperature from the first temperature detection device in which a malfunction occurs.

DESCRIPTION OF EMBODIMENTS

Figure 1:
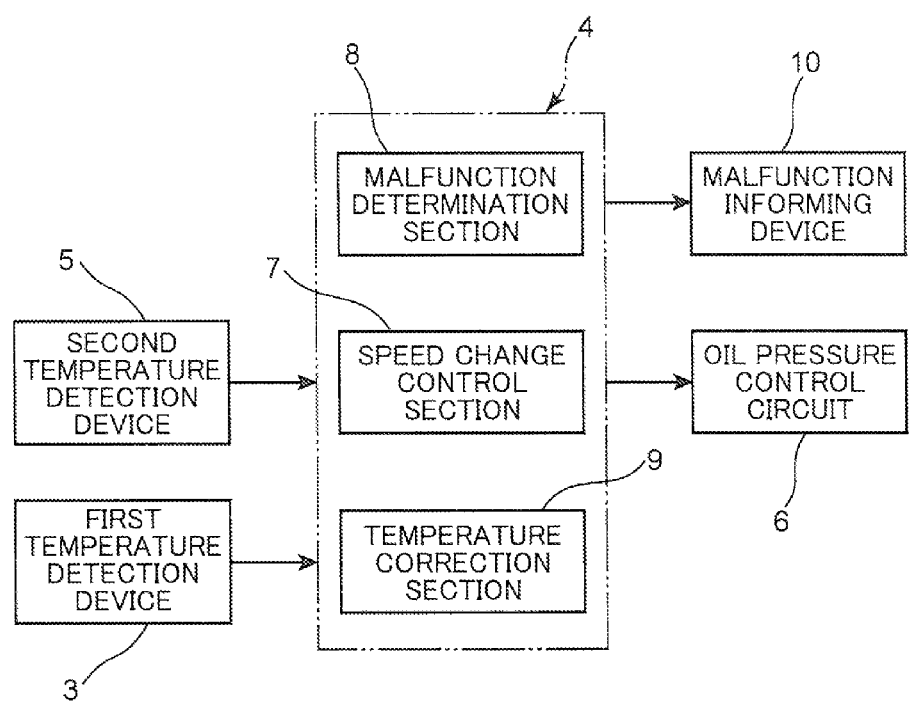
FIG. 1 is a block diagram illustrating an automatic transmission control apparatus according to one embodiment of the present invention.
Figure 2:
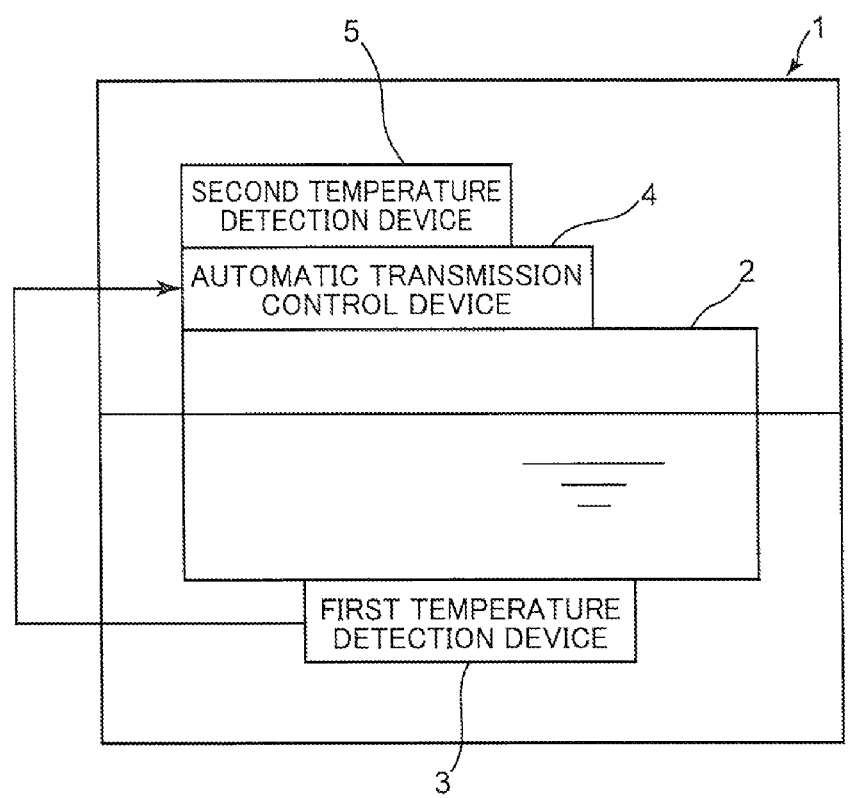
FIG. 2 is an explanatory diagram illustrating an installation state of the automatic transmission control apparatus.

FIGS. 1 and 2 illustrate an automatic transmission control apparatus according to one embodiment of the present invention. A casing 1 of the automatic transmission is internally provided with a valve body 2 of a hydraulic system for actuating a speed change mechanism, and a first temperature detection device 3 for detecting a temperature of hydraulic oil stored in the casing 1. The first temperature detection device 3 is composed of a temperature sensor comprising a detecting element installed within an oil pan of the automatic transmission and having a detection accuracy greater than that of an aftermentioned first temperature detection device 5. As used in this specification, the term "greater detection accuracy" means that a smaller detection error range.

An automatic transmission control device 4 composed, for example, of an IC board comprising a CPU and a memory element, is attached onto an upper surface of the valve body 2. That is, the automatic transmission control device 4 is disposed in the same atmosphere as that of the hydraulic oil, specifically, disposed outside a storage zone of the hydraulic oil (above the storage zone) within the casing 1.

In order to prevent runaway of the CPU due to, for example, a situation where the IC board is heated to high temperatures, the automatic transmission control device 4 is equipped with a plurality of built-in thermistors for detecting a temperature thereof. Thus, a temperature of the automatic transmission control device 4, i.e., a temperature at a position in the same atmosphere as that of the hydraulic oil and above the storage zone of the hydraulic oil, is detected by the thermistors making up a second temperature detection device 5.

The automatic transmission control device 4 comprises: a speed change control section 7 for controlling an oil pressure control circuit 6 of the automatic transmission including a solenoid valve; a malfunction determination section 8 for determining whether or not a malfunction occurs in the second temperature detection device 5 composed of the plurality of thermistors (hereinafter referred to also as "second temperature detection sections") built in the automatic transmission control device 4, and determining whether or not a malfunction occurs in the first temperature detection device 3 composed of the temperature sensor; and a temperature correction section 9 for averaging respective detected temperatures from the plurality of second temperature detection sections making up the second temperature detection device 5 and, when needed, correcting a resulting detected temperature from the second temperature detection device 5, toward a low-temperature side.

The speed change control section 7 is operable to perform a speed change control for the automatic transmission by outputting an operation command signal to the oil pressure control circuit 6 so as to allow hydraulic oil to be supplied and discharged with respect to a frictional engagement element of the automatic transmission, such as a clutch or a brake, depending on a vehicle driving state. Further, the speed change control section 7 is operable, when a temperature of the hydraulic oil detected by the first temperature detection device 3 or the like is less than a given value, to perform a control of prohibiting a speed change to a specific speed stage for preventing speed change shock and/or a sharp rise in engine speed, for example.

The malfunction determination section 8 is operable, when the engine is started, to compare respective detected temperatures from the plurality of second temperature detection sections making up the second temperature detection device 5 with each other under a given condition, and, when it is ascertained that none of a plurality of differences between respective ones of the detected temperatures includes a value equal to or greater than a given value, to determine that no malfunction occurs in the second temperature detection device 5. On the other hand, the malfunction determination section 8 is operable, when it is ascertained that the differences between respective ones of the detected temperatures from the second temperature detection sections include a value equal to or greater than the given value, to determine that a malfunction occurs in at least one of the plurality of second temperature detection sections making up the second temperature detection device 5, and then output a malfunction signal to a malfunction informing device 10 provided, for example, in a meter unit of an instrument panel.

Further, the malfunction determination section 8 is operable, when it is determined that no malfunction occurs in the second temperature detection device 5, to compare a detected temperature from the second temperature detection device after averaging by the temperature correction section 9 (an average value of detected temperatures from the plurality of second temperature detection sections), with a temperature detected by the first temperature detection device 3, and, when a temperature change rate of the hydraulic oil detected by the first temperature detection device 3 is less than a temperature change rate of the automatic transmission control device 4 detected by the second temperature detection device 5, as described later, to determine that a malfunction occurs in the first temperature detection device 3. Then, the malfunction determination section 8 is operable, when it is determined that a malfunction occurs in the first temperature detection device 3, to output a malfunction signal to the speed change control section 7 and the malfunction informing device 10.

The speed change control section 7 is operable, when a malfunction signal indicative of the occurrence of a malfunction in the first temperature detection device 3 is output from the malfunction determination section 8, to perform an automatic transmission control based on a detected temperature from the second temperature detection device 5 after correction by the temperature correction section 9, for example, perform a control of prohibiting a speed change to a specific speed stage when a correction value for a temperature of the automatic transmission control device 4 detected by the second temperature detection device 5 is less than a given value.

Figure 3:
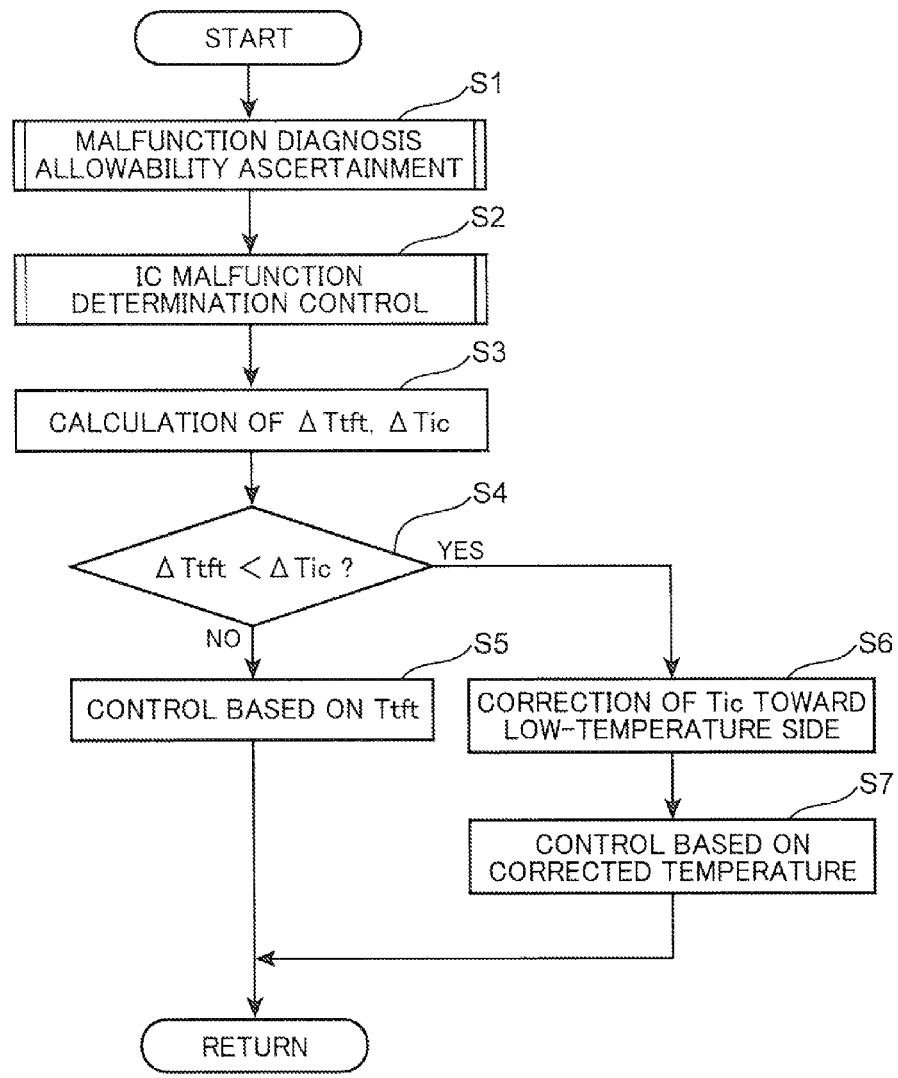
FIG. 3 is a flowchart illustrating a fundamental control operation of the control apparatus.

Based on the flowchart illustrated in FIG. 3, a fundamental control operation to be performed by the automatic transmission control device 4 will be described. Upon start of the fundamental control operation, first of all, in a sub-routine illustrated in FIG. 4, a malfunction diagnosis allowability ascertainment is performed to ascertain whether or not conditions for allowing execution of a malfunction diagnosis for the first and second temperature detection devices 3, 5 are satisfied (Step S1), and then, in a sub-routine illustrated in FIG. 5, an IC malfunction determination control is performed to determine whether or not a malfunction occurs in the second temperature detection device 5 (Step S2).

When it is determined, in the sub-routine of the Step S1, that the conditions for allowing the execution of the malfunction diagnosis for the first and second temperature detection devices 3, 5 are satisfied, and it is determined, in the sub-routine of the Step S2, that no malfunction occurs in the second temperature detection device 5, a temperature change rate $\Delta Ttft$ of the hydraulic oil detected by the first temperature detection device 3, and a temperature change rate $\Delta Tic$ of the automatic transmission control device 4 detected by the second temperature detection device 5, are calculated at a given time after engine startup (Step S3).

Figure 6:
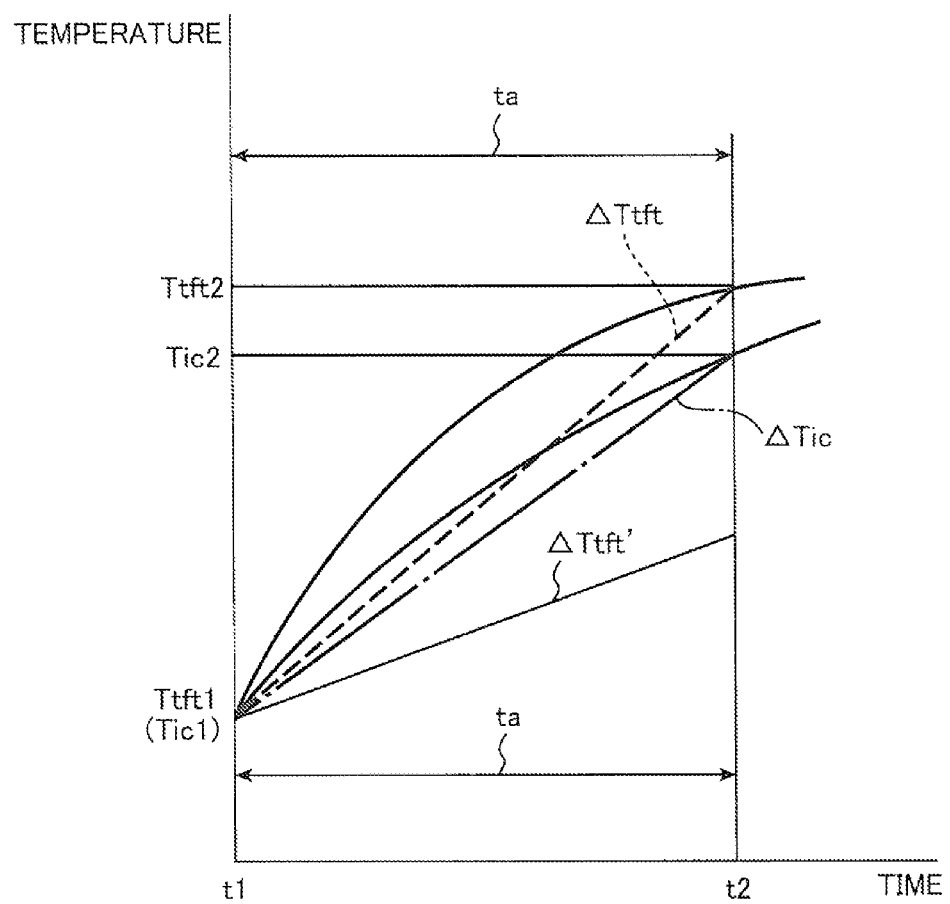
FIG. 6 is a graph illustrating a changing state of detected temperatures.

For example, as illustrated in FIG. 6, the malfunction determination section 8 calculates a difference between a detected temperature Ttft1 from the first temperature detection device 3 at an engine startup time t1, and a detected temperature Ttft2 from the first temperature detection device 3 at a time t2 when a given reference time period ta has elapsed from the engine startup time t1, and then calculates the temperature change rate $\Delta Ttft$ represented by a temperature gradient of the hydraulic oil, based on the difference between the detected temperatures (Ttft2−Ttft1) and the reference time period ta. The malfunction determination section 8 is also calculates a difference between a detected temperature Tic1 from the second temperature detection device 5 at the engine startup time t1, and a detected temperature Tic2 from the second temperature detection device 5 at the time t2 when the reference time period ta has elapsed from the engine startup time t1, and then calculate the temperature change rate $\Delta Tic$ represented by a temperature gradient of the automatic transmission control device 4, based on the difference between the detected temperatures (Tic2−Tic1) and the reference time period ta.

Subsequently, it is ascertain whether or not the temperature change rate $\Delta Ttft$ of the hydraulic oil calculated in the Step S3 is less than the temperature change rate $\Delta Tic$ of the automatic transmission control device 4 calculated in the Step S3, thereby determining whether or not malfunction occurs in the first temperature detection device 3 (Step S4). The detected temperature Ttft from the first temperature detection device 3 quickly rises along with a rise in temperature of the hydraulic oil after the engine startup, whereas the detected temperature Tic from the second temperature detection device 5 is apt to rise behind the detected temperature Ttft from the first temperature detection device 3, because heat of the hydraulic oil increased after the engine startup is transferred to an installation site of the automatic transmission control device 4 via the valve body 2 and others.

Thus, at the time t2 when the given reference time period ta set in the range of about 3 to 10 min has elapsed from the engine startup time t1, so that the detected temperature from the first temperature detection device 3 (temperature of the hydraulic oil) rises to some extent, but heat of the hydraulic oil has not yet been sufficiently transferred to the installation site of the automatic transmission control device 4, a temperature change rate $\Delta Ttft$ of the hydraulic oil detected by the first temperature detection device 3 should be greater than a temperature change rate $\Delta Tic$ of the automatic transmission control device 4 detected by the second temperature detection device 5.

Therefore, when the determination in the Step S4 is made as NO, i.e., it is ascertained that, at the time t2, the temperature change rate $\Delta Ttft$ of the hydraulic oil is equal to or greater than the temperature change rate $\Delta Tic$ of the automatic transmission control device 4, it is determined that no malfunction occurs in the first temperature detection device 3, and, based on the detected temperature Ttft from the first temperature detection device 3, the automatic transmission control is performed by the speed change control section 7 (Step S5). For example, when a temperature of the hydraulic oil detected by the first temperature detection device 3 is less than a given value, a control for preventing speed change shock and/or a sharp rise in engine speed, for example, a control of prohibiting a speed change to a specific speed stage, is performed in the Step S5.

On the other hand, when the determination in the Step S4 is made as YES, i.e., it is ascertained that, at the time t2, the temperature change rate ($\Delta Ttft'$) of the hydraulic oil is less than the temperature change rate $\Delta Tic$ of the automatic transmission control device 4, it is determined that a malfunction occurs in the first temperature detection device 3. Then, after the detected temperature Tic from the second temperature detection device 5 is corrected toward a low-temperature side by multiplying the detected temperature from the second temperature detection device 5 by a correction coefficient preliminarily set to a value of less than 1 (e.g., 0.8) (Step S6), the automatic transmission control based on the corrected temperature is performed by the speed change control section 7 (Step S7).

Figure 4:
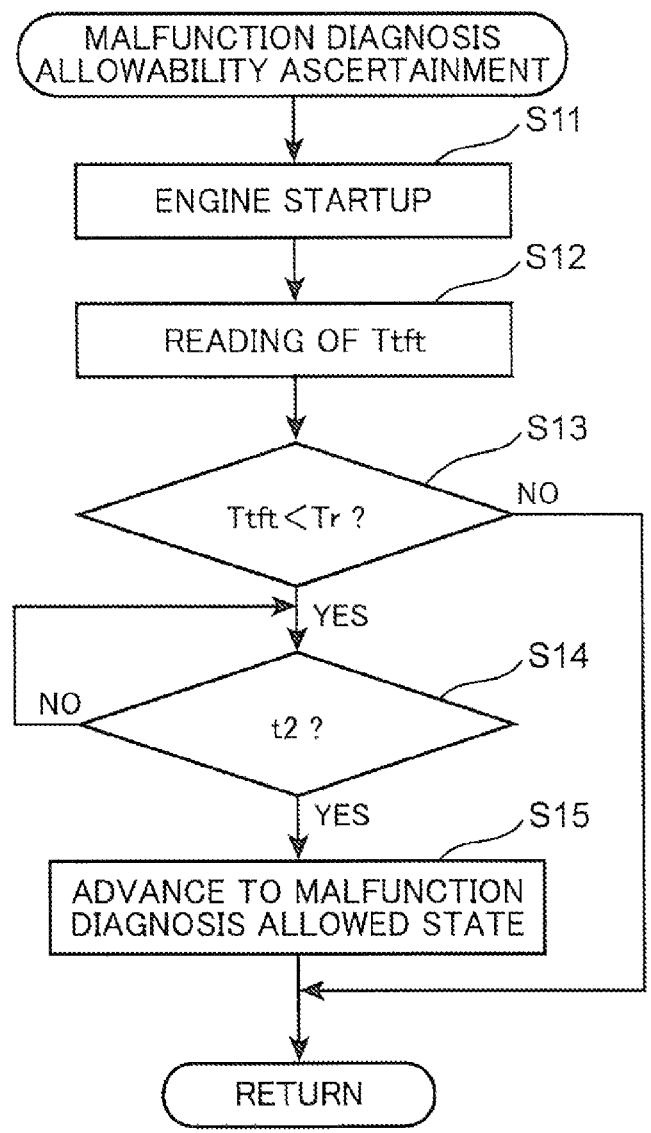
FIG. 4 is a flowchart illustrating a sub-routine in the control apparatus.

Based on the flowchart illustrated in FIG. 4, a control operation of the malfunction diagnosis allowability ascertainment for the first and second temperature detection devices 3, 5 to be performed in the Step S1 of the fundamental control operation will be described below. Upon start of this control operation, first of all, it is determined whether or not an engine startup operation is being performed according to an output signal from an ignition key switch (not illustrated) (Step S11). When the determination in the Step S11 is made as YES, i.e., it is ascertained that it is now the engine startup time t1, a detected temperature Ttft from the first temperature detection device 3 at the engine startup time t1 is read (Step S12), and it is determined whether or not the detected temperature Ttft is less than a predetermined temperature Tr (Step S13).

The reference temperature Tr is set to determine whether or not the engine is started after a given time period has elapsed from engine stop, and set to a value for allowing a determination on whether or not the engine is started after the temperature of the hydraulic oil and the temperature of the automatic transmission control device 4 disposed above the hydraulic oil are sufficiently lowered due to stop of the engine operation. When the determination in the Step S13 is made as NO, i.e., it is ascertained that, at the present time, the given time period has not elapsed after the engine stop, and the engine is restarted within a short time period after the engine stop, the sub-routine returns directly without advancing to a malfunction diagnosis allowed state described below.

On the other hand, when the determination in the Step S13 is made as YES, i.e., it is ascertained that, at the present time, the given time period has elapsed after the engine stop, and the temperature of the hydraulic oil is lowered to less than the reference temperature Tr, it is determined whether or not it is the time when the given reference time period ta has elapsed from the engine startup time t1, i.e., the detection time t2 when the temperature change rate $\Delta$Ttft of the hydraulic oil and the temperature change rate $\Delta$Tic of the automatic transmission control device 4 are detected (Step S14). Just after the determination in the Step S14 is made as YES, the sub-routine advances to the malfunction diagnosis allowed state for the first temperature detection device 3 (Step S15).

Figure 5:
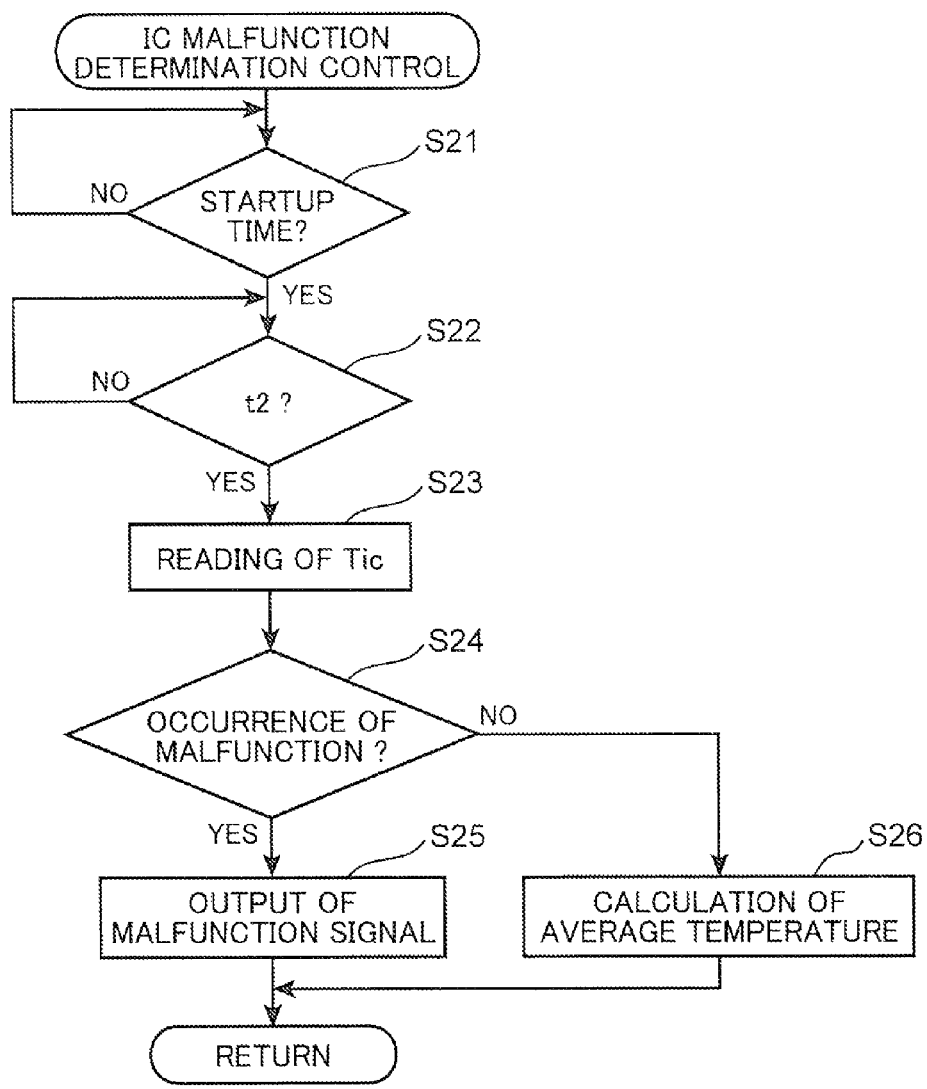
FIG. 5 is a flowchart illustrating a sub-routine in the control apparatus.

Based on the flowchart illustrated in FIG. 5, the IC malfunction determination control, i.e., a control operation of determining whether or not a malfunction occurs in the second temperature detection device 5, to be performed in the Step S2 of the fundamental control operation will be described below.

Upon start of the malfunction determination control operation, first of all, it is determined whether or not an engine startup operation is being performed according to an output signal from the ignition key switch (Step S21). When the determination in the Step S21 is made as YES, i.e., it is ascertained that it is now the engine startup time t1, it is determined whether or not it is the time when the given reference time period ta has elapsed from the engine startup time t1, i.e., the time t2 when the temperature change rate $\Delta$Ttft of the hydraulic oil and the temperature change rate $\Delta$Tic of the automatic transmission control device 4 are detected (Step S22).

Just after the determination in the Step S22 is made as YES, respective temperatures Tic of the automatic transmission control device 4 detected by the plurality of second temperature detection sections (second temperature detection device 5) provided in the automatic transmission control device 4 are read (Step S23). Then, the detected temperatures Tic are compared with each other to ascertain whether or not a plurality of differences between respective ones of the detected temperatures Tic include a value equal to or greater than a given value, thereby determining whether or not a malfunction occurs in at least one of the plurality of second temperature detection sections (Step S24). When the determination in the Step S24 is made as YES, a malfunction signal is output to the malfunction informing device 10 (Step S25).

On the other hand, when the determination in the Step S24 is made as NO, i.e., it is ascertained that no malfunction occurs in the second temperature detection device 5, the detected temperatures Tic of the plurality of second temperature detection sections making up the second temperature detection device 5 are averaged to obtain an average temperature (Step S26), and the average temperature is set as a detected temperature Tic from the second temperature detection device 5. The detected temperature Tic from the second temperature detection device 5 is apt to rise due to a current applied to the IC board constituting the automatic transmission control device 4. Thus, it is preferable that, considering a temperature rise according to an amount of current applied to the IC board, the detected temperature Tic from the second temperature detection device 5 is corrected toward a low-temperature side. This makes it possible to more adequately detect a temperature of the installation site of the automatic transmission control device 4.

As above, the automatic transmission control apparatus comprises: the first temperature detection device 3 for detecting a temperature of hydraulic oil stored in the automatic transmission; and the second temperature detection device 5 for detecting a temperature of the automatic transmission control device 4 installed in the same atmosphere as that of the storage zone of hydraulic oil, wherein the automatic transmission control apparatus is provided with the malfunction determination section 8 for comparing the temperature of the automatic transmission control device 4 detected by the second temperature detection device 5 with the temperature of the hydraulic oil detected by the first temperature detection device 3 to determine whether or not a malfunction occurs in the first temperature detection device 3. This provides an advantage of being able to adequately detect, with a simple configuration, a malfunction in the first temperature detection device 3 for detecting the temperature of the hydraulic oil stored in the automatic transmission, and effectively prevent a defect in automatic transmission control from occurring due to the occurrence of a malfunction in the first temperature detection device 3.

More specifically, in an automatic transmission control apparatus configured to detect the presence or absence of a malfunction in a temperature sensor, based on an assumed temperature of hydraulic oil assumed depending on an elapsed time period after start of an engine operation, as in the aforementioned conventional technique, an erroneous determination is highly likely to occur due to, for example, a situation where an actual temperature of the hydraulic oil fluctuates depending on an external environment, an engine operation history and others, and becomes different from the assumed temperature. In contract, the automatic transmission control apparatus according to the above embodiment (configured to determine the presence or absence of a malfunction in the first temperature detection device 3, based on a result of detection by the first temperature detection device 3 and the second temperature detection device 5) can avoid the conventional problems and accurately determine whether or not a malfunction occurs in the first temperature detection device 3 for detecting the temperature of the hydraulic oil.

As described in the above embodiment, the temperature change rate $\Delta$Ttft represented by the temperature gradient of the automatic transmission control device 4 at the time t2 when the given reference time period ta has elapsed from the engine startup time t1 is calculated based on the detected temperature from the second temperature detection device 5. In this case, even when the second temperature detection device 5 has a relatively low detection accuracy (an error range in terms of an absolute value of a detected temperature value is relatively wide), the temperature change rate $\Delta$Ttft can be highly reliably detected because a level of change in absolute value is calculated, instead of comparing absolute values. Thus, it becomes possible to accurately determine whether or not a malfunction occurs in the first temperature detection device 3, based on the temperature change rate $\Delta$Ttft.

More specifically, the first temperature detection device 3 is provided to perform, for example, a control of prohibiting a speed change to a specific speed stage, depending on the temperature of the hydraulic oil, so that it is necessary to use a high-accuracy oil temperature sensor or the like as the first temperature detection device 3. On the other hand, the second temperature detection device 5 for detecting the temperature of the automatic transmission control device 4 is provided in the automatic transmission control device 4, for example, in order to prevent runaway of the CPU due to a situation where the IC board and others are heated to high temperatures, so that, at the same temperature, a sensor having a wide detection error range (wide detection tolerance) of an output value, as compared to the first temperature detection device 3, such as a low-cost existing sensor composed of a thermistor incorporated in the automatic transmission control device 4, may be used as the second temperature detection device 5 to facilitate a reduction in cost.

Thus, when an output value (absolute value) of the second temperature detection device 5 having a relatively low detection accuracy as mentioned above and an output value (absolute value) of the first temperature detection device 3 are compared with each other to perform the malfunction determination, an erroneous determination is likely to occur due to the detection error range (detection tolerance). However, as descried in the above embodiment, the malfunction determination section 8 is operable, when it determines that the temperature change rate ΔTtft of the hydraulic oil detected by the first temperature detection device 3 at the given time after the engine startup is less than the temperature change rate ΔTic of the automatic transmission control device 4 detected by the second temperature detection device 5 at the given time after the engine startup, to determine that a malfunction occurs in the first temperature detection device 3, so that it becomes possible to effectively prevent the erroneous determination due to the use of the second temperature detection device 5 having a low detection accuracy as compared to the first temperature detection device 3. This provides an advantage of being able to effectively prevent, with a simple configuration, a defect in automatic transmission control from occurring due to a situation where the automatic transmission control is performed based on the detected temperature from the first temperature detection device 3 in which the malfunction occurs.

In the above embodiment, the malfunction determination section 8 is operable to compare temperatures of the automatic transmission control device 4 and the hydraulic oil, which are detected, respectively, by the second temperature detection device 5 and the first temperature detection device 3, when the engine is started in a situation where the temperature of the hydraulic oil is relatively low, and the temperatures of the hydraulic oil and the automatic transmission control device significantly changes, to determine whether or not a malfunction occurs in the first temperature detection device 3. This provides an advantage of being able to allow the malfunction determination section 8 to more accurately perform the malfunction determination.

In particular, as described in the above embodiment, the malfunction determination section 8 is operable, only when it is determined that the engine is started after the temperature of the hydraulic oil and the temperature of the automatic transmission control device 4 disposed above the hydraulic oil are sufficiently lowered due to stop of the engine operation, to perform the malfunction determination control for the first temperature detection device 3. This provides an advantage of being able to effectively prevent an erroneous determination from occurring due to a situation where the malfunction determination control for the first temperature detection device 3 is performed under a condition that the temperature of the hydraulic oil stored in the automatic transmission and a temperature in the same atmosphere as that of a storage zone of the hydraulic oil are in an unstable state (high-temperature state), as in the case where the engine is restarted within a short period of time after the engine stop.

It is also possible to employ a configuration in which it is determined whether or not a malfunction occurs in the first temperature detection device 3, by comparing respective detected temperatures from the first and second temperature detection devices 3, 5 at the time t2 when the given time period has elapsed from engine startup performed after the temperature of the hydraulic oil and the temperature of the automatic transmission control device 4 disposed above the hydraulic oil would be lowered to approximately the same temperatures by taking a long time from engine stop. That is, in cases where the first temperature detection device 3 and the second temperature detection device 5 have approximately the same detected temperatures, a level of temperature gradient can be evaluated by comparing respective absolute values of the detected temperatures of the first and second temperature detection devices 3, 5 at the time when the reference time period ta has elapsed from the time t1. Thus, it is possible to accurately determine whether or not a malfunction occurs in the first temperature detection device 3, simply by comparing the detected temperatures of the first and second temperature detection devices 3, 5 with each other, without calculating the temperature change rates ΔTic, ΔTtft represented by the temperature gradient of the hydraulic oil and the temperature gradient of the automatic transmission control device 4 within the given reference time period ta as mentioned above.

In the above embodiment, the speed change control section 7 of the automatic transmission control device 4 is operable, when the malfunction determination section 8 determines that a malfunction occurs in the first temperature detection device 3, to perform the automatic transmission control based on the detected temperature from the second temperature detection device 5. This provides an advantage of being able to allow the speed change control section 7 to continuously perform a speed change control without taking a measure of prohibiting the automatic transmission speed change control every time it is determined that a malfunction occurs in the first temperature detection device 3.

Particularly, in the above embodiment, the first temperature detection device 3 is disposed in the hydraulic oil stored in the automatic transmission, and the second temperature detection device 5 is installed in the automatic transmission control device 4 disposed outside the storage zone of the hydraulic oil within the automatic transmission. This provides an advantage of being able to, even when a malfunction occurs in the first temperature detection device 3 placed in an environment which is more likely to be influenced by the hydraulic oil, allow the speed change control section 7 to continuously perform the speed change control, for example, a control of prohibiting a speed change to a specific speed stage when the temperature of the hydraulic oil is relatively low, based on the detected temperature from the second temperature detection device 5 which is installed outside the storage zone of the hydraulic oil and less likely to cause malfunction.

In the above embodiment, the temperature correction section 9 is provided to correct the detected temperature from the second temperature detection device 5, toward a low-temperature side. Further, the speed change control section 7 of the automatic transmission control device 4 is operable, when the malfunction determination section 8 determines that a malfunction occurs in the first temperature detection device 3, to perform the automatic transmission control based on the detected temperature from the second temperature detection device 5 after correction by the temperature correction section 9. This provides an advantage of being able to allow the speed change control section 7 to more adequately perform the speed change control even when a sensor having a relatively low detection accuracy, such as a thermistor, is used as the second temperature detection device 5. Specifically, due to the low detection accuracy of the second temperature detection device 5, it is likely that the temperature of the hydraulic oil is erroneously determined to be equal to or greater than a given value, irrespective of a fact that the temperature of the hydraulic oil is less than the given value, and a certain speed change control is performed under a low-temperature condition of the hydraulic oil. Even in this situation, it becomes possible to effectively prevent resulting negative effects, such as speed change shock and sharp rise of engine speed.

In the above embodiment, the plurality of second temperature detection sections are provided, as the second temperature detection device 5, in the same atmosphere as that of the storage zone of the hydraulic oil, and the malfunction determination section 8 is operable to compare respective detected temperatures from the second temperature detection sections with each other to determine whether or not a malfunction occurs in the second temperature detection device (i.e., or not a malfunction occurs in any of the second temperature detection sections making up the second temperature detection device 5), and, when it is determined that no malfunction occurs in the second temperature detection device 5, to determine whether or not a malfunction occurs in the first temperature detection device 3, based on a detected temperature from the second temperature detection device 5. In this manner, the malfunction determination for the first temperature detection device 3 is performed. This provides an advantage of being able to reliably prevent an erroneous determination from occurring due to the situation where the malfunction determination for the first temperature detection device 3 is performed based on the detected temperature of the second temperature detection device 5 in which a malfunction occurs, and accurately perform the malfunction determination for the first temperature detection device 3 based on the detected temperature of the second temperature detection device 5 in a normal state.

In the above embodiment, the malfunction determination section 8 is operable, when, as a result of comparing respective detected temperatures from the plurality of second temperature detection sections with each other, it is determined that no malfunction occurs in the second temperature detection device 5, to determine whether or not a malfunction occurs in the first temperature detection device 3, based on an average value of the detected temperatures from the plurality of second temperature detection sections. As above, the detected temperature of the second temperature detection device 5 is obtained through means of averaging. Thus, it becomes possible to prevent the occurrence of a significant difference between an actual temperature and the detected temperature, even when the second temperature detection device 5 has a relatively low detection accuracy. This provides an advantage of being able to accurately perform the malfunction determination for the first temperature detection device 3 based on the detected temperature of the second temperature detection device 5.

Three or more second temperature detection sections may be provided as the second temperature detection device 5, and the malfunction determination section 8 may be operable to compare respective detected temperatures from the second temperature detection sections with each other to determine whether a malfunction occurs in the second temperature detection device 5, and, when it is determined that a malfunction occurs in at least one of the second temperature detection sections, to determine whether or not a malfunction occurs in the first temperature detection device 3, based on the detected temperatures from the remaining second temperature detection sections. For example, when it is ascertained that a temperature of the automatic transmission control device 4 detected by a specific one of the second temperature detection sections is largely different from a temperature of the automatic transmission control device 4 detected by each of the remaining two or more second temperature detection sections, it is determined that a malfunction occurs in the specific second temperature detection section, and eliminate the specific second temperature detection section from any control. This makes it possible to adequate perform the malfunction determination for the first temperature detection device 3.

In the above embodiment, the first temperature detection device 3 is disposed in the hydraulic oil stored in the automatic transmission, and the automatic transmission control device 4 is disposed outside a storage zone of the hydraulic oil within the automatic transmission. This provides an advantage of being able to, in a normal state in which no malfunction occurs in the first temperature detection device 3, allow the first temperature detection device 3 to accurately detect the temperature of the hydraulic oil, and allow the speed change control section 7 of the automatic transmission control device 4 to adequately perform the automatic transmission control based on the detected temperature, while preventing the automatic transmission control device 4 from being adversely affected by the hydraulic oil.

Outline of Embodiment

The present invention provides an automatic transmission control apparatus which comprises: a first temperature detection device for detecting a temperature of hydraulic oil stored in an automatic transmission; an automatic transmission control device installed in a same casing as that in which the hydraulic oil is stored; a second temperature detection device for detecting a temperature of the automatic transmission control device; and a malfunction determination section for comparing the temperature of the automatic transmission control device detected by the second temperature detection device with the temperature of the hydraulic oil detected by the first temperature detection device to determine whether or not a malfunction occurs in the first temperature detection device.

A conventional technique includes a type configured to detect the presence or absence of a malfunction in a temperature sensor based on an assumed temperature of hydraulic oil assumed depending on an elapsed time period after start of an engine operation. In this type of conventional technique, an erroneous determination is likely to occur due to, for example, a situation where an actual temperature of the hydraulic oil fluctuates depending on an external environment, an engine operation history and others, and becomes different from the assumed temperature. In contract, the automatic transmission control apparatus of the present invention can solve the above conventional problems to obtain an advantage of being able to accurately determine a malfunction in the first temperature detection device, and effectively prevent, with a simple configuration, a defect in automatic transmission control from occurring due to a situation where the automatic transmission control is performed based on a detected temperature from the first temperature detection device in which a malfunction occurs.

In one embodiment of the present invention, the first temperature detection device has a detection error range smaller than that in the second temperature detection device, and the malfunction determination section is operable, when a temperature change rate of the hydraulic oil detected by the first temperature detection device is less than a temperature change rate of the automatic transmission control device detected by the second temperature detection device, to determine that a malfunction occurs in the first temperature detection device.

In this automatic transmission control apparatus, the first temperature detection device composed, for example, of an oil temperature sensor for detecting a temperature of hydraulic oil stored in an automatic transmission is provided to perform, for example, a control of prohibiting a speed change to a specific speed stage, depending on the detected temperature, so that a high-accuracy sensor is used, as compared to the second temperature detection device provided in the automatic transmission control device, for example, in order to prevent runaway of a CPU due to a situation where an IC board and others are heated to high temperatures. Thus, a detection error range (detection tolerance) of an output value of the first temperature detection device is required to be narrow, as compared to a detection error range of an output value of the second temperature detection device, at the same temperature.

Thus, when an output value (absolute value) of the second temperature detection device having a relatively low detection accuracy as mentioned above and an output value (absolute value) of the first temperature detection device are compared with each other to perform the malfunction determination, an erroneous determination is likely to occur due to the detection error range. In this regard, the malfunction determination section is operable, when a temperature change rate of the hydraulic oil detected by the first temperature detection device is less than a temperature change rate of the automatic transmission control device detected by the second temperature detection device, to determine that a malfunction occurs in the first temperature detection device. This makes it possible to adequately determine whether or not a malfunction occurs in the first temperature detection device, even when a sensor having a low detection accuracy as compared to the first temperature detection device is used as the second temperature detection device.

In one embodiment of the present invention, the malfunction determination section is operable, at a time when a given time period has elapsed from engine startup, to determine whether or not a malfunction occurs in the first temperature detection device.

In this automatic transmission control apparatus, the malfunction determination section is operable to compare temperatures of the automatic transmission control device and the hydraulic oil, which are detected, respectively, by the second temperature detection device and the first temperature detection device, when the given time period has elapsed from engine startup in a situation where the temperature of the hydraulic oil is relatively low, and the temperatures of the hydraulic oil significantly changes, to determine whether or not a malfunction occurs in the first temperature detection device. This provides an advantage of being able to allow the malfunction determination section to more accurately perform the malfunction determination.

In one embodiment of the present invention, the malfunction determination section is operable, when the temperature of the hydraulic oil detected by the first temperature detection device at engine startup is less than a reference temperature, to start a measurement for the given time period.

In this automatic transmission control apparatus, the reference temperature is set to determine whether or not the engine is started after a given time period has elapsed from engine stop, and set to allow a determination on whether or not the engine is started after the temperature of the hydraulic oil and the temperature of the automatic transmission control device are sufficiently lowered due to stop of the engine operation. In other words, when the given time period has not elapsed after the engine stop, and the engine is restarted within a short time period after the engine stop, the temperature of the hydraulic oil has been already raised, and a result of temperature detection, obtained by the first and second temperature detection devices at engine startup or at the time when the given time period has elapsed from engine startup, cannot be effectively utilized.

In one embodiment of the present invention, the automatic transmission control device is operable, when the malfunction determination section determines that a malfunction occurs in the first temperature detection device, to perform an automatic transmission control based on the detected temperature from the second temperature detection device.

In this automatic transmission control apparatus, the automatic transmission control device is operable, when the malfunction determination section determines that a malfunction occurs in the first temperature detection device, to perform an automatic transmission control based on the detected temperature from the second temperature detection device. This provides an advantage of being able to, even when a malfunction occurs in the first temperature detection device placed in an environment which is more likely to be influenced by the hydraulic oil, allow the automatic transmission control device section to continuously perform a speed change control, for example, a control of prohibiting a speed change to a specific speed stage when the temperature of the hydraulic oil is relatively low, based on the detected temperature from the second temperature detection device for detecting a temperature of the automatic transmission control device installed in the same atmosphere as that of a storage zone of the hydraulic oil.

In one embodiment of the present invention, the automatic transmission control apparatus comprises a temperature correction section for correcting the detected temperature from the second temperature detection device, toward a low-temperature side, wherein the automatic transmission control device is operable, when the malfunction determination section determines that a malfunction occurs in the first temperature detection device, to perform the automatic transmission control based on the detected temperature from the second temperature detection device after correction by the temperature correction section.

In this automatic transmission control apparatus, the temperature correction section for correcting the detected temperature from the second temperature detection device, toward a low-temperature side, is provided, and the automatic transmission control device is operable, when the malfunction determination section determines that a malfunction occurs in the first temperature detection device, to perform the automatic transmission control based on the detected temperature from the second temperature detection device after correction by the temperature correction section. Thus, due to the low detection accuracy of the second temperature detection device, it is likely that the temperature of the hydraulic oil is erroneously determined to be equal to or greater than a given value, irrespective of a fact that the temperature of the hydraulic oil is less than the given value, and a certain speed change control is performed under a low-temperature condition of the hydraulic oil. Even in this situation, it becomes possible to effectively prevent resulting negative effects, such as speed change shock and sharp rise of engine speed.

In one embodiment of the present invention, the second temperature detection device comprises a plurality of second temperature detection sections, wherein the malfunction determination section has a function of comparing respective detected temperatures from the second temperature detection sections with each other to determine whether or not a malfunction occurs in the second temperature detection sections, and is operable, when it is determined that no malfunction occurs in the second temperature detection device, to determine whether or not a malfunction occurs in the first temperature detection device, based on a detected temperature from the second temperature detection device.

This automatic transmission control apparatus provides an advantage of being able to reliably prevent an erroneous determination from occurring due to the situation where the malfunction determination for the first temperature detection device is performed based on the detected temperature of the second temperature detection device in which a malfunction occurs, and accurately perform the malfunction determination for the first temperature detection device based on the detected temperature of the second temperature detection device in a normal state.

In one embodiment of the present invention, the malfunction determination section is operable, when it is determined that no malfunction occurs in the second temperature detection device as a result of comparing respective detected temperatures from the plurality of second temperature detection sections with each other, to determine whether or not a malfunction occurs in the first temperature detection device, based on an average value of the detected temperatures from the second temperature detection sections.

In this automatic transmission control apparatus, it becomes possible to prevent the occurrence of a significant difference between an actual temperature and the detected temperature, even when the second temperature detection device has a relatively low detection accuracy, and accurately perform the malfunction determination for the first temperature detection device based on the detected temperature of the second temperature detection device.

In one embodiment of the present invention, the first temperature detection device is disposed in the hydraulic oil stored in the automatic transmission, and the automatic transmission control device is disposed outside a storage zone of the hydraulic oil.

This automatic transmission control apparatus provides an advantage of being able to, in a normal state in which no malfunction occurs in the first temperature detection device, allow the first temperature detection device to accurately detect the temperature of the hydraulic oil, and allow the automatic transmission control device to adequately perform an automatic transmission speed change control based on the detected temperature, while preventing the automatic transmission control device from being adversely affected by the hydraulic oil.

According to another aspect of the present invention, there is provided a method of controlling an automatic transmission having a first temperature detection device, a second temperature detection device and an automatic transmission control device. The method comprises: detecting, by the first temperature detection device, a temperature of hydraulic oil stored in the automatic transmission; detecting, by the second temperature detection device, a temperature of the automatic transmission control device installed in a same casing as that in which the hydraulic oil is stored; and comparing the temperature of the automatic transmission control device detected by the second temperature detection device with the temperature of the hydraulic oil detected by the first temperature detection device to determine whether or not a malfunction occurs in the first temperature detection device.

A conventional technique includes a type configured to detect the presence or absence of a malfunction in a temperature sensor based on an assumed temperature of hydraulic oil assumed depending on an elapsed time period after start of an engine operation. In this type of conventional technique, an erroneous determination is likely to occur due to, for example, a situation where an actual temperature of the hydraulic oil fluctuates depending on an external environment, an engine operation history and others, and becomes different from the assumed temperature. In contract, the method of the present invention can solve the above conventional problems to obtain an advantage of being able to accurately determine a malfunction of the first temperature detection device, and effectively prevent, with a simple configuration, a defect in automatic transmission control from occurring due to a situation where the automatic transmission control is performed based on a detected temperature from the first temperature detection device in which a malfunction occurs.

This application is based on Japanese Patent Application Serial No. 2010-290887 filed in Japan Patent Office on Dec. 27, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An automatic transmission control apparatus comprising:
    a first temperature detection device for detecting a temperature of hydraulic oil stored in an automatic transmission;
    an automatic transmission control device installed in a same casing as that in which the hydraulic oil is stored;
    a second temperature detection device for detecting a temperature of the automatic transmission control device; and
    a malfunction determination section for comparing the temperature of the automatic transmission control device detected by the second temperature detection device with the temperature of the hydraulic oil detected by the first temperature detection device to determine whether or not a malfunction occurs in the first temperature detection device.

2. The automatic transmission control apparatus as defined in claim 1, wherein:
    the first temperature detection device has a detection error range smaller than that in the second temperature detection device; and
    the malfunction determination section is operable, when a temperature change rate of the hydraulic oil detected by the first temperature detection device is less than a temperature change rate of the automatic transmission control device detected by the second temperature detection device, to determine that a malfunction occurs in the first temperature detection device.

3. The automatic transmission control apparatus as defined in claim 1, wherein the malfunction determination section is operable, at a time when a given time period has elapsed from engine startup, to determine whether or not a malfunction occurs in the first temperature detection device.

4. The automatic transmission control apparatus as defined in claim 1, wherein the automatic transmission control device is operable, when the malfunction determination section determines that a malfunction occurs in the first temperature detection device, to perform an automatic transmission control based on the detected temperature from the second temperature detection device.

5. The automatic transmission control apparatus as defined in claim 1, wherein:
the second temperature detection device comprises a plurality of second temperature detection sections; and
the malfunction determination section has a function of comparing respective detected temperatures from the second temperature detection sections with each other to determine whether or not a malfunction occurs in the second temperature detection sections, and is operable, when it is determined that no malfunction occurs in the second temperature detection device, to determine whether or not a malfunction occurs in the first temperature detection device, based on a detected temperature from the second temperature detection device.

6. The automatic transmission control apparatus as defined in claim 1, wherein the first temperature detection device is disposed in the hydraulic oil stored in the automatic transmission, and the automatic transmission control device is disposed outside a storage zone of the hydraulic oil within the automatic transmission.

7. The automatic transmission control apparatus as defined in claim 3, wherein the malfunction determination section is operable, when the temperature of the hydraulic oil detected by the first temperature detection device at engine startup is less than a reference temperature, to start a measurement for the given time period.

8. The automatic transmission control apparatus as defined in claim 4, further comprising a temperature correction section for correcting the detected temperature from the second temperature detection device, toward a low-temperature side, wherein the automatic transmission control device is operable, when the malfunction determination section determines that a malfunction occurs in the first temperature detection device, to perform the automatic transmission control based on the detected temperature from the second temperature detection device after correction by the temperature correction section.

9. The automatic transmission control apparatus as defined in claim 5, wherein the malfunction determination section is operable, when it is determined that no malfunction occurs in the second temperature detection device as a result of comparing respective detected temperatures from the plurality of second temperature detection sections with each other, to determine whether or not a malfunction occurs in the first temperature detection device, based on an average value of the detected temperatures from the second temperature detection sections.

10. A method of controlling an automatic transmission having a first temperature detection device, a second temperature detection device and an automatic transmission control device, comprising:
detecting, by the first temperature detection device, a temperature of hydraulic oil stored in the automatic transmission;
detecting, by the second temperature detection device, a temperature of the automatic transmission control device installed in a same casing as that in which the hydraulic oil is stored; and
comparing the temperature of the automatic transmission control device detected by the second temperature detection device with the temperature of the hydraulic oil detected by the first temperature detection device to determine whether or not a malfunction occurs in the first temperature detection device.

* * * * *